(12) United States Patent
Wauke et al.

(10) Patent No.: US 6,693,772 B1
(45) Date of Patent: Feb. 17, 2004

(54) HEAD CARRIAGE

(75) Inventors: Tomokuni Wauke, Fukushima-ken (JP); Takashi Nakagawa, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 374 days.

(21) Appl. No.: 09/586,853

(22) Filed: Jun. 5, 2000

(30) Foreign Application Priority Data

Jun. 15, 1999 (JP) .......................................... 11-167835

(51) Int. Cl.[7] .......................... G11B 21/16; G11B 5/48; G11B 21/08; G11B 5/55
(52) U.S. Cl. ..................................... 360/244; 360/266.2
(58) Field of Search ............................. 360/244, 255.1, 360/255.2, 255.3, 255.4, 255.5, 266.2, 245.7, 244.2, 240, 250, 254

(56) References Cited

U.S. PATENT DOCUMENTS

| | | | |
|---|---|---|---|
| 4,323,938 A | 4/1982 | Thompson | 360/255.5 |
| 4,704,646 A * | 11/1987 | Okita | 360/246.3 |
| 4,710,836 A * | 12/1987 | Hishi | 360/254.1 |
| 4,748,522 A * | 5/1988 | Takahashi et al. | 360/246.3 |
| 4,763,213 A | 8/1988 | Muroyama | 360/255.3 |
| 5,396,385 A | 3/1995 | Tangi et al. | 360/254.1 |
| 5,610,781 A | 3/1997 | Watanabe | 360/99.06 |
| 5,828,520 A | 10/1998 | Nakagawa et al. | 360/246.3 |

* cited by examiner

*Primary Examiner*—Julie Anne Watko
(74) *Attorney, Agent, or Firm*—Brinks Hofer Gilson & Lione

(57) ABSTRACT

A head carriage device includes a carriage, a head arm, a flat spring extending from the head arm, a fixing member to fix the flat spring to the carriage, a resilient member to resiliently urge the head arm in a direction in which the head arm moves toward the carriage, a lifting mechanism to pivot the head arm away from and toward the carriage, and a finger to which the lifting mechanism is applied, the finger being provided at one side of the head arm. The head carriage device is provided with a first protrusion and a second protrusion. When the head arm is pivoted away from the carriage, a restricting finger restricts the movement of a free end of the first protrusion away from the carriage, and a restricting face provided on the carriage restricts the movement of a free end of the second protrusion toward the carriage.

10 Claims, 9 Drawing Sheets

HEAD CARRIAGE

BACKGROUND OF THE INVENTION

1. Field of the Invention

The present invention relates to a head carriage device of a floppy disc drive used as an external memory device and the like of a computer.

2. Description of the Related Art

FIG. 9 and FIG. 10 are a plan view and a side view, respectively, of a head carriage device 1. FIG. 11 is a front view, in a direction E, of the head carriage device 1 shown in FIG. 9.

As shown in FIGS. 9 and 10, the head carriage device 1 includes a carriage 2, which is held movably in a radial direction of a floppy disc 9 (in a direction R in the drawings) and which is provided with a magnetic head 5. The head carriage device 1 also includes a head arm 3 having a magnetic head 6 opposing the magnetic head 5, a flat spring 4 extending from an end 3b of the head arm 3, and a fixing member 11 connecting the flat spring 4 to the carriage 2. The fixing member 11 overlaps a free end of the flat spring 4. The head carriage device 1 further includes a torsion spring 7 resiliently urging the magnetic head 6 toward the magnetic head 5 at an anchoring point 3c provided at the central part in the width direction (in a direction shown by arrows W in FIG. 9) of the head arm 3, and a finger 3a supported by a lifting mechanism 8 and protruding toward the outside from one of the sides along the direction R of the head arm 3, for pivoting the head arm 3 in direction increasing the spacing between the magnetic head 6 and the magnetic head 5 (direction A in FIG. 10).

The head carriage device 1 operates as follows. When a cartridge 10 holding a floppy disc 9 is inserted in a floppy disc drive (not shown), as shown in FIG. 11, the lifting mechanism 8 is applied to the finger 3a. The magnetic head 6 moves in the direction A (unloading direction) while being supported through the finger 3a, as shown in FIG. 10. The lifting mechanism 8 forces the distance between the magnetic head 6 and the magnetic head 5 to increase, against the resilient force of the torsion spring 7.

When the cartridge 10 is completely inserted in the floppy disc drive, the lifting mechanism 8 releases the unloaded state of the head arm 3. The head arm 3 then moves in a direction B (loading direction), as shown in FIG. 10, in which the magnetic head 6 approaches the magnetic head 5, and the magnetic heads 5 and 6 clamp the floppy disc 9 with a predetermined pressing force. The pressing force is determined by the torsion spring 7. The floppy disc 6 is subsequently driven by a spindle motor (not shown) and reading/writing of information is performed by the magnetic heads 5 and 6.

However, in the head carriage device 1, in which the head arm 3 turns while being supported at one side of the head arm 3, it is possible for the magnetic head 6 to interfere with the cartridge 10 at an end 6a of the magnetic head 6 when inserting the cartridge 10 in the floppy disc drive. This interference occurs due to the structure of the head carriage device 1. Because the head arm 3 is fixed to the carriage 2 through the fixing member 11 at the free end of the flat spring 4 extending from the end 3b of the head arm 3, when the head arm 3 turns along the direction A shown in FIG. 10, the head arm 3 is inclined from a horizontal line H shown in FIG. 11. Thus, the distance between the magnetic head 6 mounted on the head arm 3 and the magnetic head 5 is larger at an end 6b of the magnetic head 6 at the side of the finger 3a than the distance at the opposing end 6a of the magnetic head 6. A torque D, shown in FIG. 11, causes the inclination of the head arm 3. The torque D is produced because an anchoring point C of the finger 3a, to which the lifting mechanism 8 is applied, is disposed at a distance from the anchoring point 3c of the head arm 3 to which a pressing force F of the torsion spring 7 is applied.

Another head carriage device 20, shown in FIGS. 12 and 13, is disclosed in Japanese Unexamined Patent Application Publication No. 2-11541. This head carriage device 20 prevents the inclination described above. FIG. 12 and FIG. 13 are a plan view and a side view of the head carriage device 20, respectively.

The head carriage device 20 shown in FIGS. 12 and 13 includes a carriage 21, a head arm 22, a magnetic head 23 mounted on the head arm 22 at an end thereof, and a magnetic head 31 mounted on the carriage 21. A flat spring 24, a fixing member 25, and a torsion spring 27 are disposed opposing the magnetic head 23. Components that have the same function as that of the components of the head carriage device 1 shown in FIGS. 9, 10, and 11 are referred to with the same reference numerals in FIGS. 12 and 13.

In the head carriage device 20, a first protrusion 22b protrudes over the upper face of the flat spring 24 from an end of one of the lateral sides of the head arm 22 along a direction R of the head arm 22, and a second protrusion 25a protrudes over the upper face of the flat spring 24 from the fixing member 25 at the other lateral side, provided with a finger 22a, of the head arm 22. The first and second protrusions 22b and 25a oppose each other in the width direction of the head arm 22.

With this arrangement, as shown in FIG. 12, when the head arm 22 moves in a direction A shown in FIG. 13 while being supported by the lifting mechanism 26 at the finger 22a, the flat spring 24 twists along a line 28 extending between joining parts M and N in a flexible part of the flat spring 24. The line 28 forms an angle θ with a line 30 along the width of the head arm 22, because the joining part M disposed in the vicinity of the first protrusion 22b formed on the head arm 22 is closer to the fixing member 25 than the joining part N disposed in the vicinity of the second protrusion 25a formed on the fixing member 25.

When the torsion spring 27 shown in FIG. 12 is eliminated, the head arm 22 is inclined from the horizontal line H by an angle α, as shown in FIG. 14A, in a manner such that a lateral side 22-2 of the head arm 22 is disposed higher than a lateral side 22-1 thereof which opposes the lateral side 22-2 and which is provided with the finger 22a.

The head arm 22 provided with the torsion spring 27 at a central part P of the head arm 22, as shown in FIG. 14B, which is the position of the anchoring point 22c, is kept horizontal by the torque D shown in FIG. 11. The torque D is produced by the pressing force of the torsion spring 27 and offsets the inclination in which the lateral side 22-2 is higher than the lateral side 22-1 by angle α.

However, with this arrangement, a problem exists in that the head arm 22 cannot be maintained in a stable horizontal position perpetually. The pressing force of the torsion spring 27 and the lifting force of the flat spring 24 lifting the lateral side 22-2 of the head arm 22 to form angle α are not always balanced due to variations in the angle α and the pressing force F (shown in FIG. 11). These variations are caused by variations in the thickness of the flat spring 24, which is within the manufacturing tolerances, and variations in pressing force of the torsion spring 27.

As shown in FIG. 14A, the flexible part of the flat spring 24 comes into contact with the first protrusion 22b having a width L5 and the second protrusion 25a having a width L6 at the joining parts M and N, respectively. Another problem of the head carriage device 20 is that the width L5 and the width L6 are small and large stresses are concentrated thereto when the head arm 22 turns. This reduces the durability of the flat spring 24. The flat spring 24 is plastically deformed and eventually breaks at the joining parts M and N due to the repeated pivoting motion of the head arm 22. This reduces the durability of the head carriage device 20.

In addition, in the head carriage device 20, different stresses are applied depending on the position along the line 28 (see FIG. 12) between the joining parts M and N of the flexible part of the flat spring 24. This prevents the head arm 22 from pivoting smoothly.

Further, in the head carriage device 20, lengths L3 and L4 of the first and second protrusions 22b and 25a, respectively, and the widths L5 and L6 of the first and second protrusions 22b and 25a, respectively, must be designed in the proper shape so that the lifting force applied to the lateral side 22-2 of the head arm 22 is offset by the torque D produced by the pressing force F of the torsion spring 27. The resulting design is complex and difficult. When the specifications of the head carriage device 20 are changed, that is, when the value of the pressing force F of the torsion spring 27 and the thickness of the flat spring 24 are changed, the shapes and the like of the first and second protrusions 22b and 25a must be redesigned, thereby limiting design options.

SUMMARY OF THE INVENTION

Accordingly, it is an object of the present invention to provide a head carriage device in which a head arm can be maintained in stably and horizontally when the head arm is pivoted while being supported at one lateral side thereof. Further objectives include improving the durability of a flat spring for a repeated, smooth, pivoting motion of the head arm and providing a simple design having flexible design options.

To this end, according to an aspect of the present invention, a head carriage device comprises a carriage supported to be movable in a radial direction of a floppy disc. A head arm is provided with a magnetic head at an end thereof and a flat spring extends from the other end of the head arm. A fixing member fixes the flat spring to the carriage and overlaps a free end of the flat spring. A resilient member resiliently urges the head arm in a direction in which the head arm moves toward the carriage and a lifting mechanism pivots the head arm both away from and toward the carriage. A finger, to which the lifting mechanism is applied, is provided at one of the lateral sides of the head arm along the radial direction.

In the head carriage device, a first protrusion is provided protruding from an end of the lateral side of the head arm provided with the finger. A second protrusion is provided protruding from an end of the lateral side of the head arm opposing the lateral side provided with the finger. The movement of a free end of the first protrusion away from the carriage is restricted and the movement of a free end of the second protrusion toward the carriage is restricted.

In the head carriage device according to the invention, a restricting finger made of a protruding part of the fixing member may restrict the movement of the free end of the first protrusion. A restricting face provided on the carriage restricts the movement of the free end of the second protrusion.

Additionally, the second protrusion may be made longer than the first protrusion. Each of the free ends may include a curved surface having a predetermined curvature. The free ends may include curved surfaces having substantially the same curvature.

DESCRIPTION OF THE PREFERRED EMBODIMENT

A head carriage device 100 according to an embodiment of the present invention is described below with reference to FIGS. 1 to 8.

Figure 1:
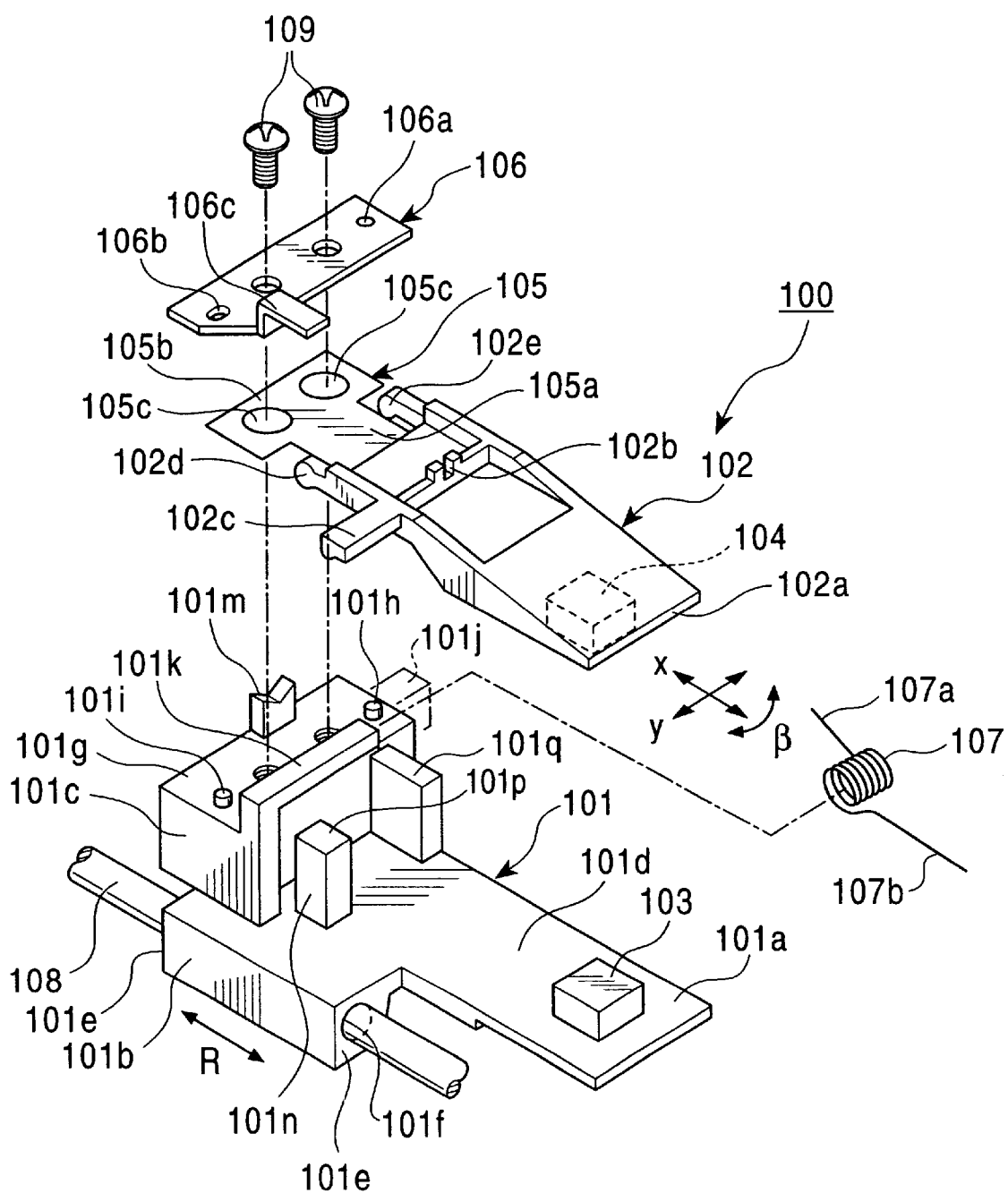
FIG. 1 is an exploded perspective view of a head carriage device according to an embodiment of the present invention.
Figure 2:
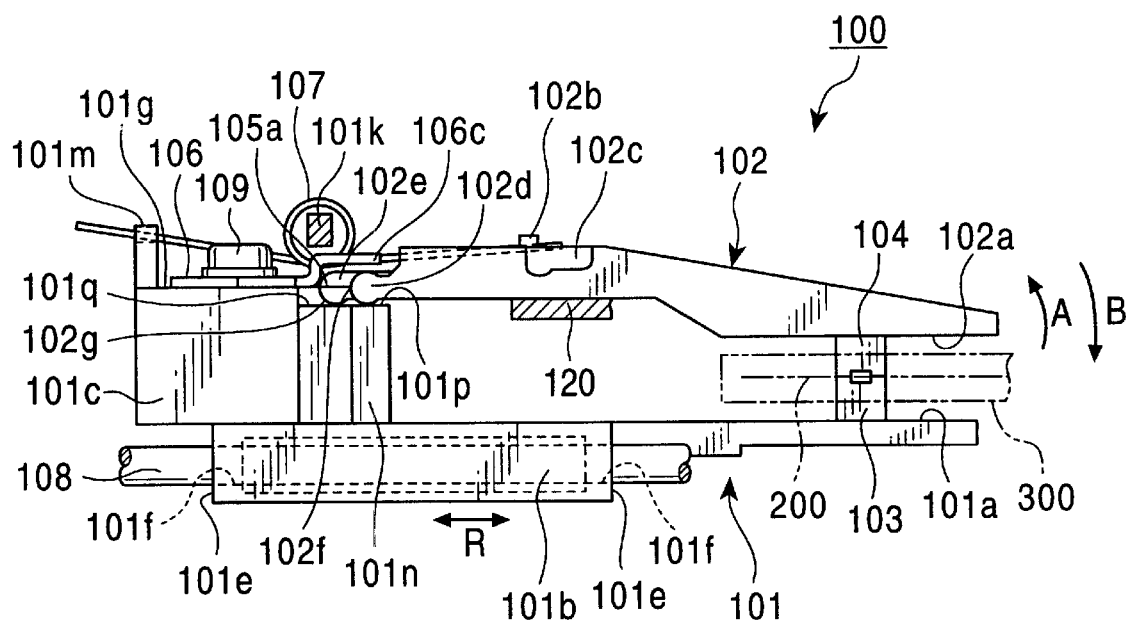
FIG. 2 is a side view of the head carriage device shown in FIG. 1 according to the embodiment of the invention.

FIG. 1 is an exploded perspective view of the head carriage device 100, and FIG. 2 is a side view of the same.

The head carriage device 100 shown in FIG. 1 includes a carriage 101 of a molded resin, a head arm 102 of a molded resin, and a magnetic head 103 mounted on the carriage 101 at an end 101a thereof. The head carriage device 100 includes a magnetic head 104 opposing the magnetic head 103 and mounted on the head arm 102 at an end 102a thereof, a flat spring 105 extending from the head arm 102, and a fixing member 106 overlapping a free end of the flat spring 105 to fix the flat spring 105 to the carriage 101. The head carriage device 100 also includes a torsion spring 107 to resiliently urge the head arm 102 in a direction in which the magnetic heads 103 and 104 are brought into contact with each other (in a direction B in FIG. 2).

The carriage 101 includes a shaft receiving part 101b, a mounting base 101c, and a planar base plate 101d formed substantially in a rectangle. The carriage 101 is provided with through-holes 101f through ends 101e of the shaft receiving part 101b, as shown in FIG. 2. A shaft 108 mounted on a chassis (not shown) is received to pass through the through-holes 101f, whereby the carriage 101 is held to move in a direction R which is a radial direction of a floppy disc 200, as shown in FIG. 2. The carriage 101 is provided with a coupler 101j which mates with a lead screw driven by a stepper motor (not shown), thereby driving the carriage 101 in the direction R.

The head arm 102 is provided with the flat spring 105 by insert molding at the end opposing the end 102a in the direction R. The flat spring 105 includes a flexible part 105a and a fixing part 105b. The fixing part 105b is placed on a fixing area 101g of the mounting base 101c of the carriage 101. The fixing part 105b is screwed to the mounting base 101c, with the fixing member 106 disposed on the fixing part 105b, by screws 109 passing through the fixing member 106 and the fixing part 105b. The carriage 101 supports the head arm 102 such that the head arm 102 can pivot in a direction A shown in FIG. 2 as the flexible part 105a of the flat spring 105 bends. The fixing member 106 is positioned on the fixing area 101g by mating a through-hole 106a and an elongated through-hole 106b with protrusions 101h and 101i, respectively, provided on the fixing area 101g.

The head arm 102 has lateral sides along the direction R, substantially parallel with the shaft 108. The lateral sides are proximate and distal to the shaft 108. The head arm 102 is provided with a finger 102c protruding outward (substantially perpendicular to the direction R) on the lateral side proximate to the shaft 108. The head arm 102 is pivoted in the direction A in FIG. 2 and held in a position in the pivoting motion by a lifting mechanism 120 shown in FIG. 2 which is applied to the finger 102c. The head arm 102 has a first protrusion 102d on the finger 102c side and a second protrusion 102e on the side opposite to the finger 102c side. The protrusions 102c, 102e are provided at an end of the head arm 102 opposite to the end 102a.

The second protrusion 102e is larger than the first protrusion 102d. The first protrusion 102d is disposed on a mounting face 101p which is the top surface of a mounting stand 101n provided on the base plate 101d of the carriage 101. The second protrusion 102e is disposed on a restricting face 101q of which the height from the base plate 101d is the same as that of the mounting face 101p, the restricting face 101q extending from the mounting base 101c along a line parallel to the surface of the base plate 101d. The fixing member 106 is provided with a restricting finger 106c formed integrally with the fixing member 106 and protruding to cover the first protrusion 102d.

Before fixing the fixing part 105b of the flat spring 105 to the mounting base 101c with the fixing member 106, the position of the head arm 102 is adjusted in directions x, y, and β in FIG. 1 such that the magnetic head 104 is properly associated with the read/write position of the floppy disc 200. The fixing part 105b of the flat spring 105 is provided with through-holes 105c, which are formed sufficiently larger than the diameter of the screws 109, to allow the head arm 102 to move within a range necessary to enable the adjustment described above.

The torsion spring 107 is mated with a cantilever arm 101k protruding from the fixing area 101g of the mounting base 101c of the carriage 101 in a direction substantially perpendicular to the direction R and over the base plate 101d. The torsion spring 107 is anchored at an end 107a to a spring anchoring part 101m protruding from the fixing area 101g of the carriage 101, and at an end 107b opposite to the end 107a to a spring anchoring part 102b provided on the head arm 102.

Figure 3:
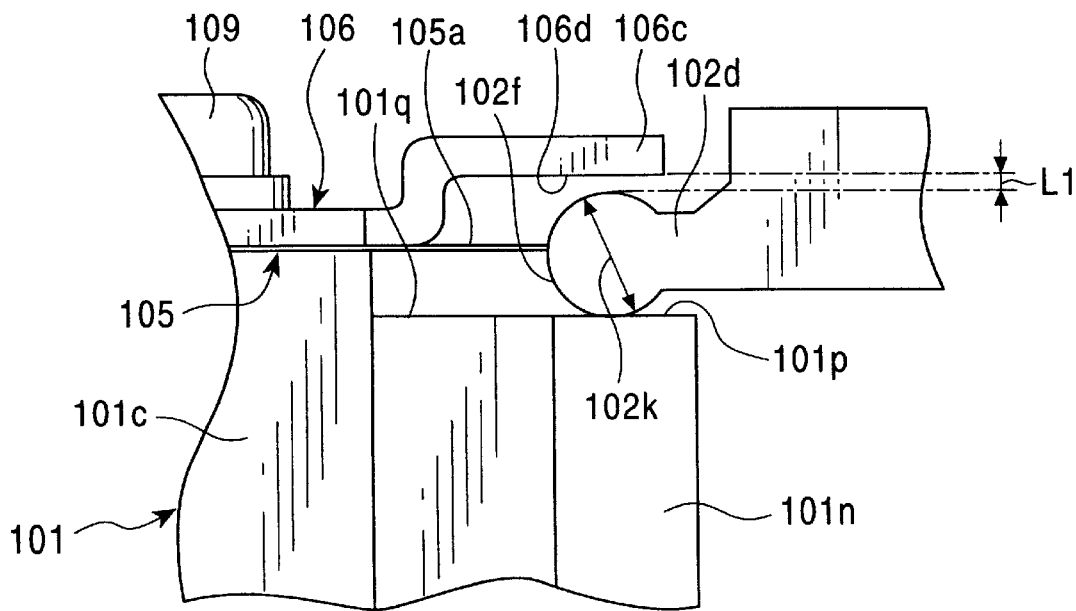
FIG. 3 is an expanded side view of a portion of the head carriage device shown in FIG. 1 according to the embodiment of the invention.

An operation of the head carriage device 100 having the above-described configuration is described as follows in conjunction with FIGS. 1 to 3.

FIG. 2 shows the head carriage device 100 with the components shown in FIG. 1 assembled together. The head arm 102 is urged by the torsion spring 107 in a direction in which the magnetic head 104 comes into contact with the magnetic head 103 (in the direction B in FIG. 2). When a cartridge 300 holding the floppy disc 200 is received (loaded) in a floppy disc drive, the magnetic heads 103 and 104 clamp the floppy disc 200 with a load properly applied thereto, and a read/write operation is performed.

The first protrusion 102d of the head arm 102 is provided at the free end thereof with a curved surface 102f having a predetermined curvature extending more than 180 degrees. The lower surface of the curved surface 102f is in contact with the mounting face 101p of the mounting stand 101n provided on the carriage 101. The second protrusion 102e of the head arm 102 is provided at the free end thereof with a curved surface 102g. The curved surface 102g has the same curvature as that of the curved surface 102f of the first protrusion 102d. The lower surface of the curved surface 102g is in contact with the restricting face 101q of the carriage 101. As shown in FIG. 3, the restricting finger 106c is formed of a protruding part of the fixing member 106 and is provided with a restricting face 106d disposed such that a gap L1 exists between the restricting face 106d and the upper surface of the curved surface 102f of the first protrusion 102d. Without any appreciable gap existing, the production variation in the diameter 102k of the curved surface 102f may cause the diameter 102k of the curved surface 102f to be larger than the distance between the mounting face 101p and the restricting face 106 (i.e. a tighter machining tolerance exists). However, providing the gap L1 decreases this probability and permits the curved surface 102f to be received between the mounting face 101p and the restricting face 106d.

The head carriage device 100 operates as follows when the cartridge 300 is discharged (unloaded) from the floppy disc drive, which is described with reference to FIG. 4.

Figure 4:
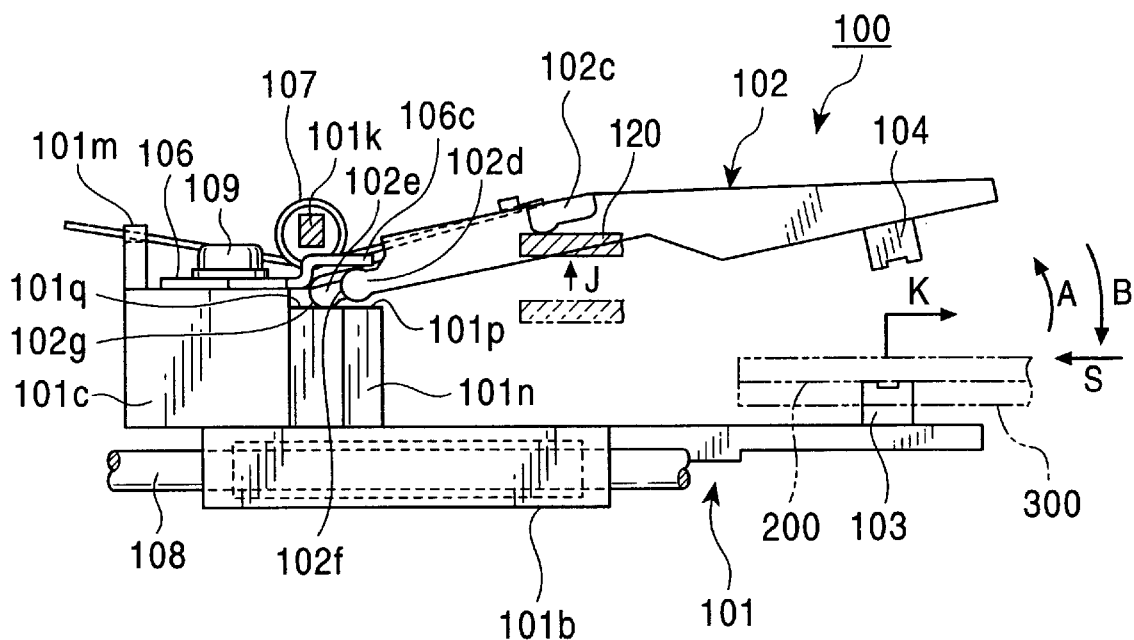
FIG. 4 is a side view of the head carriage device shown in FIG. 1 according to the embodiment of the invention, in which a head arm is pivoted.

When unloading the cartridge 300, the lifting mechanism 120 moves in a direction J in FIG. 4 and supports the finger 102c provided on the head arm 102, whereby the head arm 102 turns in the direction A and is held in a position. As the head arm 102 moves upwardly, the cartridge 300 moves in a direction K in FIG. 4 and is unloaded outside the floppy disc drive.

Figure 5:
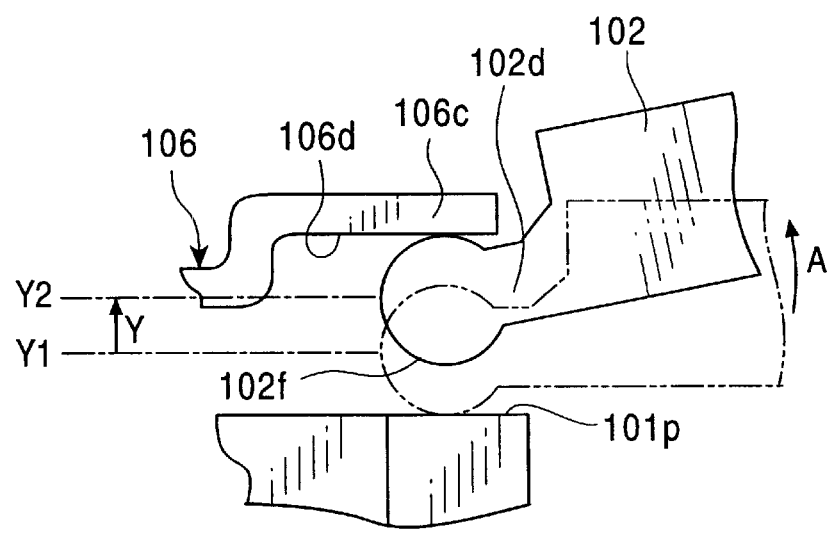
FIG. 5 is an expanded side view of the head carriage device shown in FIG. 1 according to the embodiment of the invention, in which a first protrusion of the head arm is shown when the head arm is pivoted.

As shown in FIG. 5, as the head arm 102 moves upwardly in the unloading operation of the cartridge 300, the curved surface 102f formed on the first protrusion 102d of the head arm 102 at the free end of the first protrusion 102d moves upwardly in a direction Y shown in the drawing. The curved surface 102f moves from a level Y1, at which the curved surface 102f is in contact with the mounting face 101p, to a level Y2, at which the upper surface of the curved surface 102f is in contact with the restricting face 106d of the fixing member 106.

Figure 6:
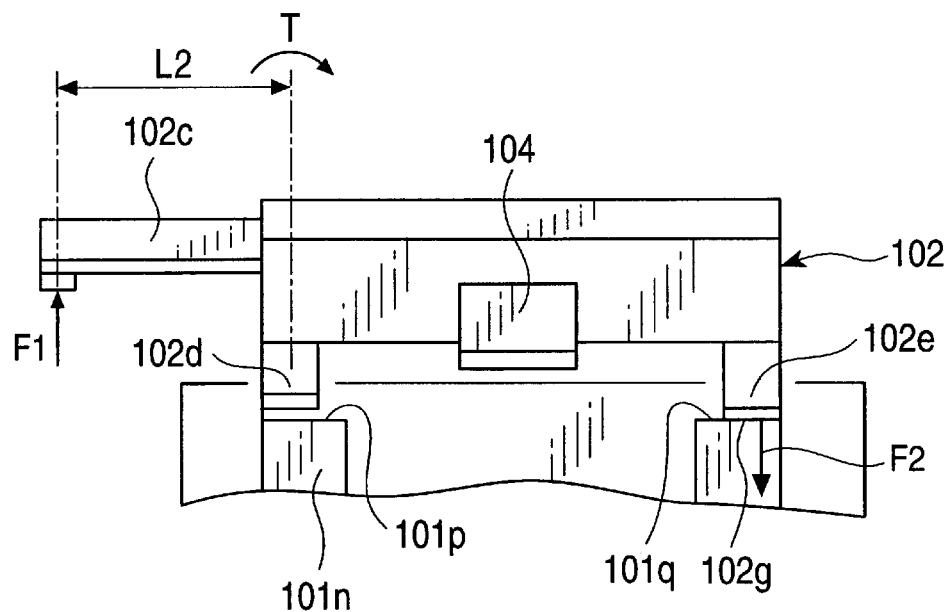
FIG. 6 is a front view, in a direction S, of a portion of the head carriage device shown in FIG. 4 according to the embodiment of the invention.

In FIG. 6, which is a front view, in a direction S, of a portion of the head carriage device 100 shown in FIG. 4, a lifting force F1 of the lifting mechanism 120 (not shown in FIG. 6) is applied to the finger 102c of the head arm 102 at a distance L2 away from the first protrusion 102d. This produces a torque T, given by an expression F1×L2, applied to the head arm 102. The curved surface 102g, formed on the second protrusion 102e of the head arm 102 at an end of the protrusion 102e, is forced in a direction of a pressing force F2. As a result, the curved surface 102g is forced into contact with the restricting face 101q and the restricting face 101q restricts the position of the curved surface 102g.

Figure 7:
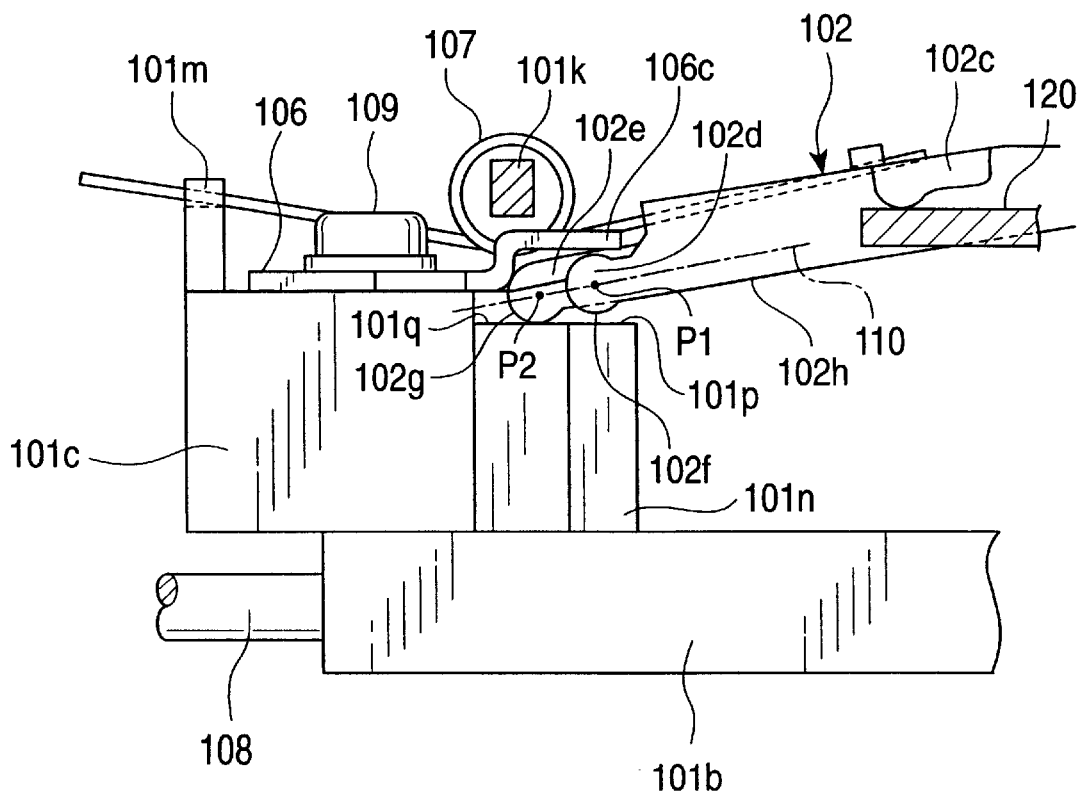
FIG. 7 is a side view of the head carriage device shown in FIG. 1 according to the embodiment of the invention, in which the relationship between the first protrusion and a second protrusion is shown when the head arm is pivoted.

As shown in FIG. 7, a center P2 of the curved surface 102g of the second protrusion 102e is disposed closer to the mounting base 101c than a center P1 of the curved surface 102f of the first protrusion 102d, in a direction along a line 110 on the center P1 parallel to lower edges 102h of the lateral sides of the head arm 102, whereby the head arm 102 pivots substantially at the center P2.

Figure 8:
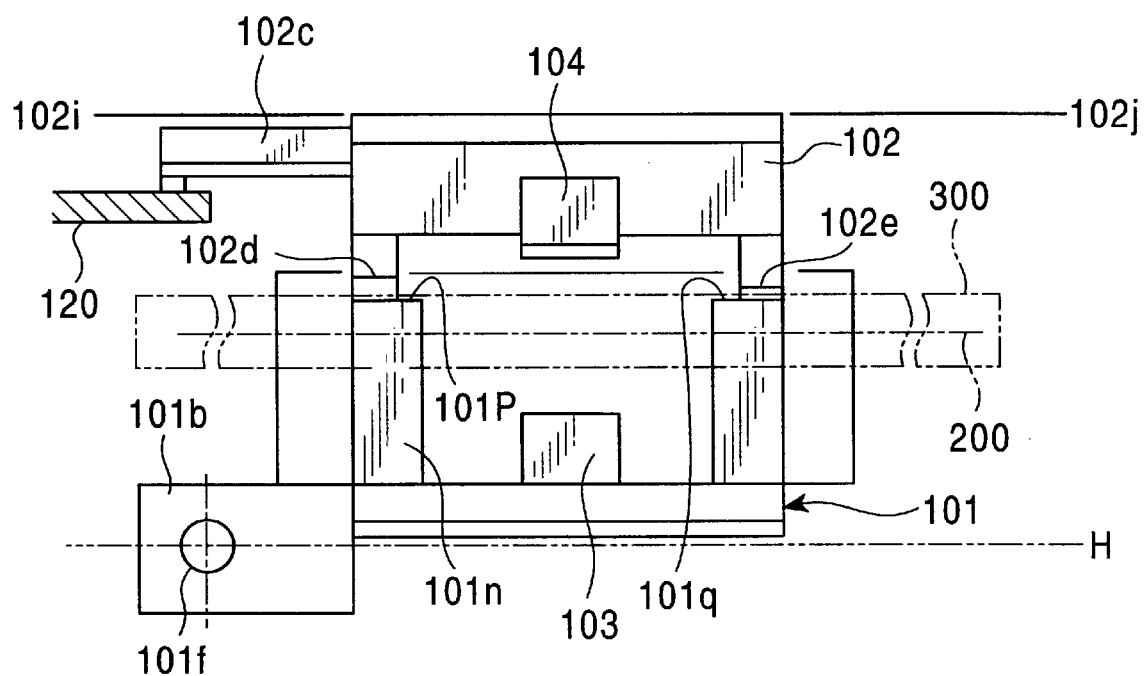
FIG. 8 is a front view, in the direction S, of the head carriage device shown in FIG. 4 according to the embodiment of the invention.
Figure 9:
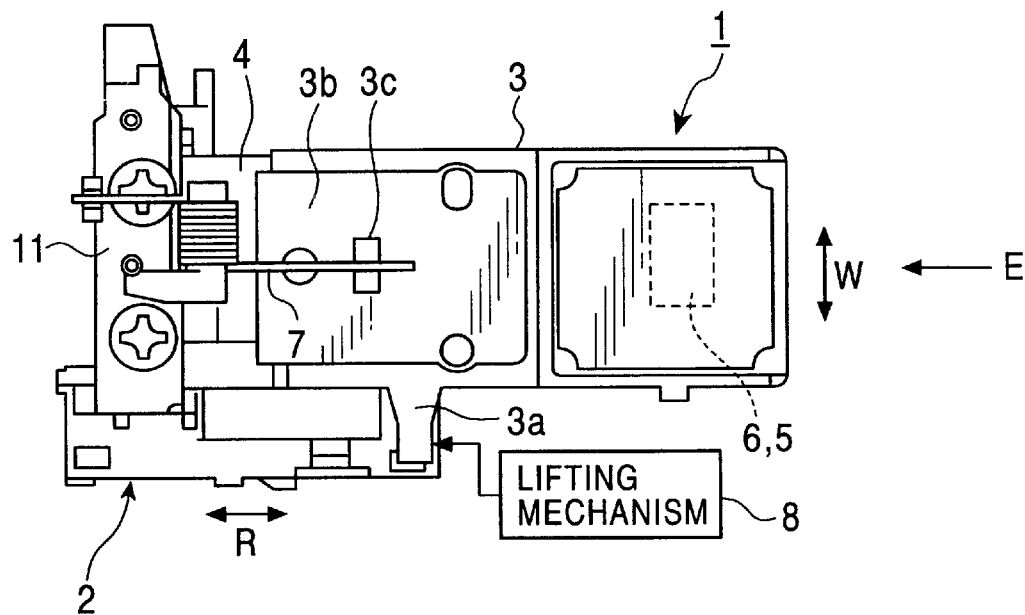
FIG. 9 is a plan view of a known head carriage device.
Figure 10:
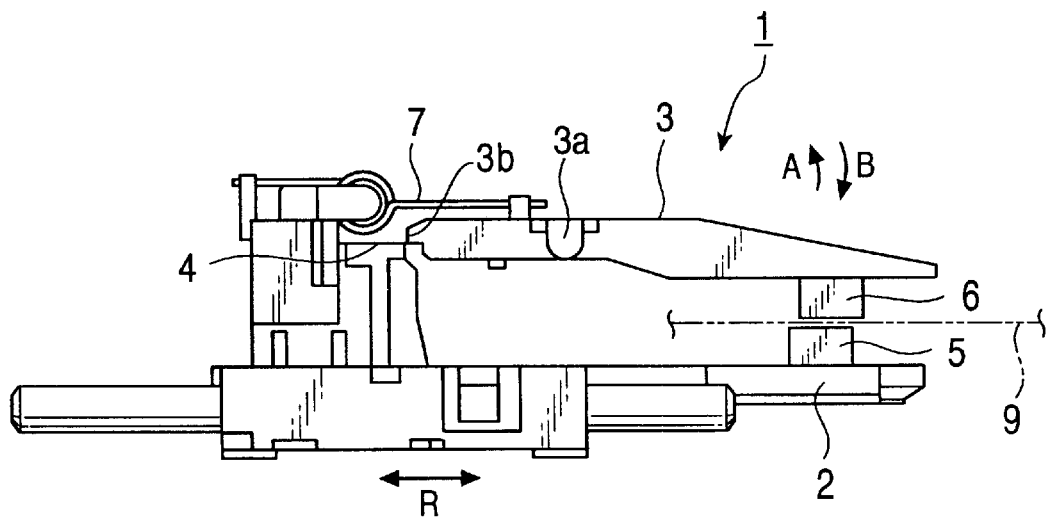
FIG. 10 is a side view of the known head carriage device shown in FIG. 9.
Figure 11:
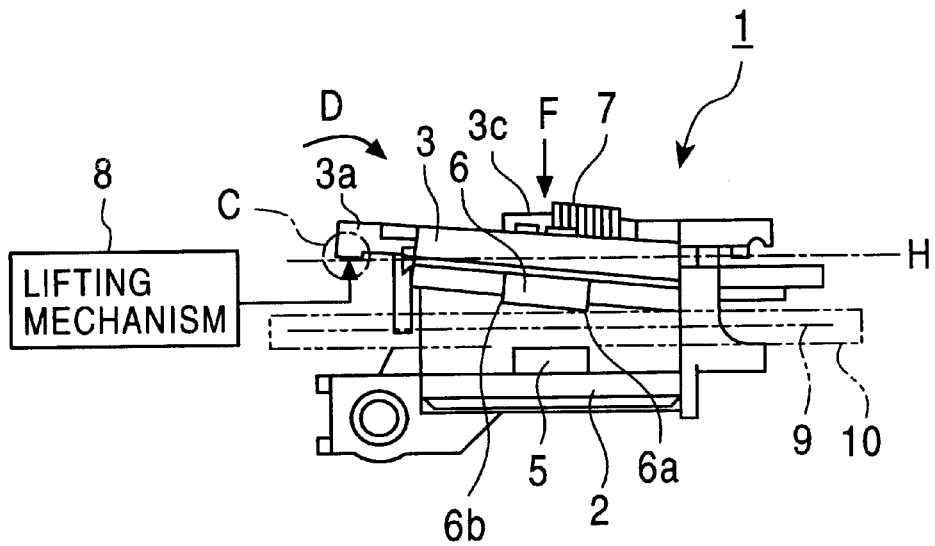
FIG. 11 is a front view, in a direction E, of the known head carriage device shown in FIG. 9.
Figure 12:
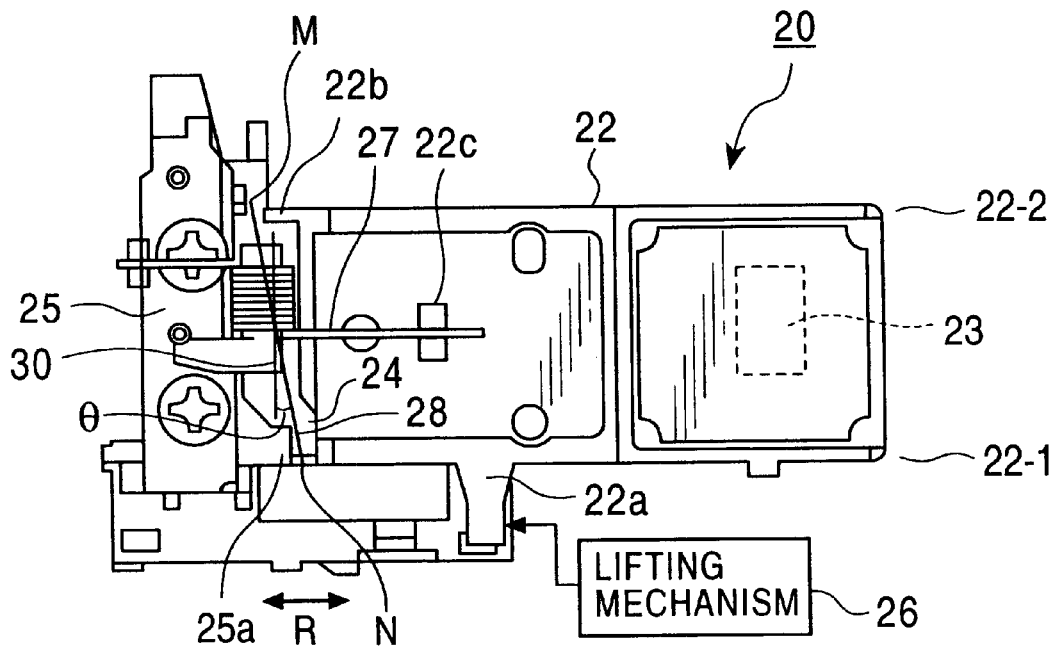
FIG. 12 is a plan view of another known head carriage device.
Figure 13:
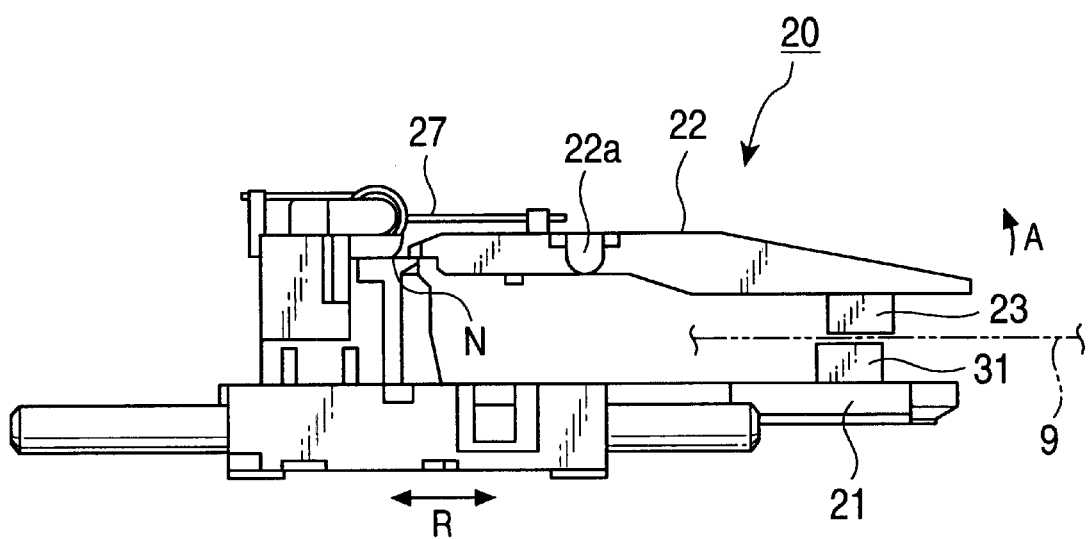
FIG. 13 is a side view of the known head carriage device shown in FIG. 12.
Figure 14A:
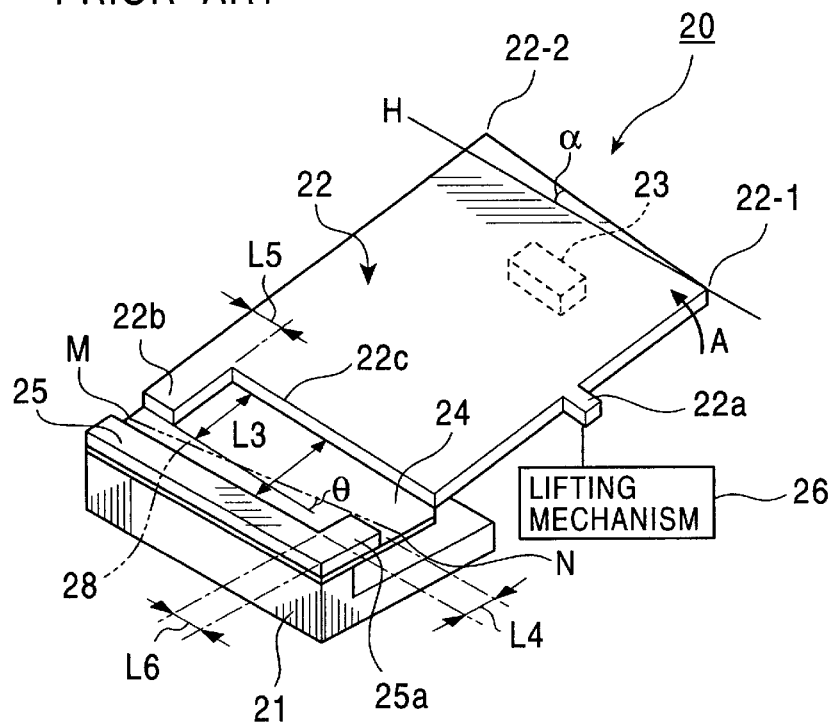
FIG. 14A and FIG. 14B are perspective views of the known head carriage device shown in FIG. 12, in which the operation of a head arm is shown.
Figure 14B:
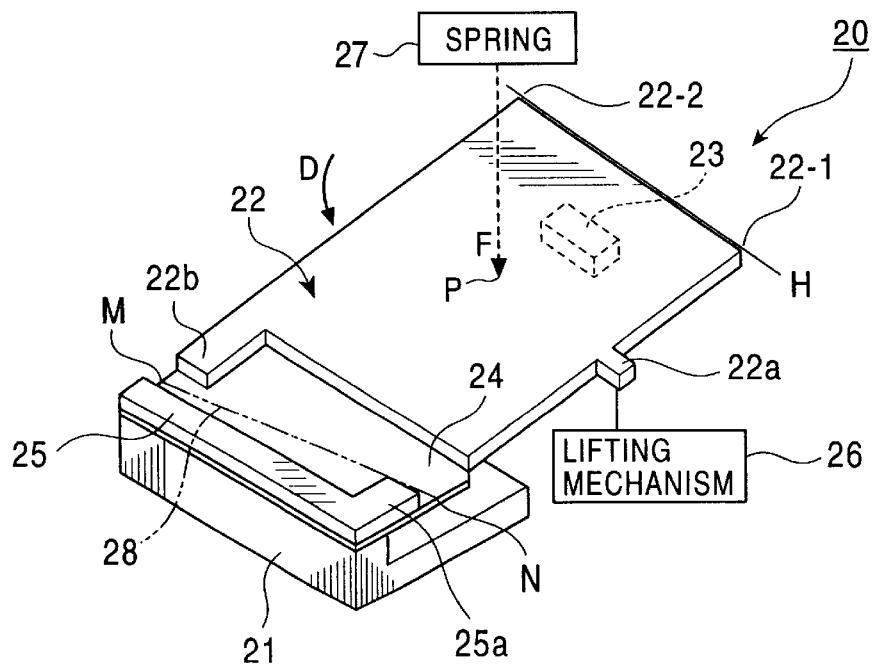

FIG. 8 is a front view in the direction S of a portion of the head carriage device 100 shown in FIG. 4. In the head carriage device 100 according to the embodiment, when the head arm 102 rotates while being held at the finger 102c provided at one lateral side of the head arm 102, an upper edge 102i of the head arm 102 on the finger 102c side and an upper edge 102j thereof on the side opposite to the finger 102c are maintained at the same level from a horizontal line H, as shown in FIG. 8. This permits the head arm 102 to be stably maintained in a horizontal position. Therefore, the magnetic head 104 does not interfere with the cartridge 300 when the cartridge 300 is loaded in the floppy disc drive.

In the embodiment depicted in FIG. 1, stresses do not vary in the flexible part 105a of the flat spring 105. Therefore, when the head arm 102 is repeatedly pivoted, the flat spring 105 is not plastically deformed and the durability is thereby improved. In addition, the first and second protrusions 102d and 102e of the head arm 102 are slidably movable along the faces in contact with the curved surfaces 102f and 102g provided at the free ends of the first and second protrusions 102d and 102e, respectively. Therefore, the head arm 102 can be smoothly loaded and unloaded.

Furthermore, the curved surfaces 102f and 102g have the same curvature, which allows the sizes to be formed easily and increases the simplicity of the design. According to the embodiment of the invention, as the curved surfaces 102f and 102g are formed with the same curvature, the first and second protrusions 102d and 102e are disposed at the same level from the mounting face 101p and the restricting face 101q, respectively, when the head arm 102 is pivoted down close to the carriage 101, thereby maintaining the head arm 102 in a horizontal position.

Because of the configuration of the head carriage device 100, in which the second protrusion 102e extends farther from the center of the head arm 102 than the first protrusion 102d (i.e. the second protrusion 102e is longer than the first protrusion 102d), the performance of the head carriage device 100 is unaffected by the characteristics of the flat spring 105 and the torsion spring 107. Therefore, when the specifications of the head carriage device 100, such as the thickness of the flat spring 105 and the resilient force of the torsion spring 107, vary it is unnecessary to alter the shape of the first and second protrusions 102d and 102e and the like. Thus, this arrangement has a flexible design.

As described above, the head carriage device according to the present invention includes a carriage supported to be movable in a radial direction of a floppy disc, a head arm provided with a magnetic head mounted on an end thereof, a flat spring extending from the other end of the head arm, and a fixing member to fix the flat spring to the carriage. The fixing member overlaps a free end of the flat spring. The head carriage device also includes a resilient member that resiliently urges the head arm in a direction in which the head arm moves toward the carriage, a lifting mechanism that pivots the head arm to a position away from or toward the carriage, and a finger, to which the lifting mechanism is applied, provided at one of the lateral sides of the head arm along the radial direction of the floppy disc. In the head carriage device, a first protrusion is provided protruding from an end of the lateral side of the head arm provided with the finger, a second protrusion is provided protruding from an end of the lateral side of the head arm opposite to the lateral side provided with the finger, the free end of the first protrusion is restricted in the movement away from the carriage, and the free end of the second protrusion is restricted in the movement toward the carriage. With this arrangement, the movement of each free end of the first protrusion and the second protrusion can be restricted when the head arm is pivoted while being supported at one lateral side, whereby the head arm can be stably maintained in a horizontal position.

A restricting finger formed of a protruding part of the fixing member restricts the movement of the free end of the first protrusion. A restricting face provided on the carriage restricts the movement of the free end of the second protrusion. Therefore, there are no portions in a flexible part of the flat spring in which stresses vary, whereby the flat spring is not plastically deformed by repeated pivoting, thereby improving the durability of the flat spring.

The second protrusion is longer than the first protrusion, making it unnecessary to change the shape of the head arm and the like when the thickness of the flat spring and the resilient force of the resilient member and the like vary, thereby achieving a flexible design.

As each free end of the first and second protrusions is provided with a curved surface having a predetermined curvature, the first and second protrusions can smoothly move with reduced frictional resistance while being in contact with associated surfaces at each curved surface, thereby providing a smooth pivoting movement of the head arm.

Additionally, when the same curvature is provided on the curved surfaces of the free ends of the first and second protrusions, the size of the first and second protrusions can be easily set geometrically.

What is claimed is:

1. A head carriage device comprising:
   a carriage supported movably in a predetermined direction;
   a head arm provided with a magnetic head at one end thereof, the head arm having lateral sides substantially parallel to the predetermined direction;
   a flat spring extending from an opposing end of said head arm;
   a fixing member to fix said flat spring to said carriage, the fixing member overlapping a free end of the flat spring;
   a resilient member to resiliently urge said head arm in a direction toward said carriage;
   a lifting mechanism to pivot said head arm away from and toward the carriage;
   a finger to which said lifting mechanism is applied, the finger being provided on one of the lateral sides of said head arm;
   a mounting face provided on said carriage;
   a first protrusion having a free end, wherein the first protrusion protrudes from an end of one of the lateral sides of the head arm with the finger, wherein the free end comprises a curved surface having a predetermined curvature, wherein the movement of the free end away from said carriage is restricted by a restricting finger;

a second protrusion having another free end, wherein the second protrusion protrudes from an end of one of the lateral sides of the head arm opposite from the end of one of the lateral sides of the head arm with the finger, wherein the another free end comprises a curved surface having a predetermined curvature, wherein the movement of the another free end toward said carriage is restricted by the mounting face; and wherein at least one of the first and second protrusions is slidably movable along the mounting face.

2. A head carriage device according to claim 1, further comprising:

said restricting finger comprising a protruding part of said fixing member, the restricting finger restricting the movement of the free end of the first protrusion; and a restricting face provided on said carriage, the restricting face restricting the movement of the free end of the second protrusion.

3. A head carriage device according to claim 2, wherein said second protrusion is longer than said first protrusion.

4. A head carriage device according to claim 2, said curved surfaces of said free ends having substantially the same curvature.

5. A head carriage device according to claim 1, wherein the first and second protrusions are slidably movable in the carriage.

6. A head carriage device comprising:

a carriage supported movably in a predetermined direction;

a head arm provided with a magnetic head at one end thereof, the head arm having lateral sides substantially parallel to the predetermined direction;

a flat spring extending from an opposing end of said head arm;

a fixing member to fix said flat spring to said carriage, the fixing member overlapping a free end of the flat spring;

a resilient member to resiliently urge said head arm in a direction toward said carriage;

a lifting mechanism to pivot said head arm away from and toward the carriage;

a finger to which said lifting mechanism is applied, the finger being provided on one of the lateral sides of said head arm;

a restriction mechanism to restrict movement of the opposing end of the head arm such that when the head arm is pivoted while being supported at one lateral side, the head arm is moved stably and radially;

a mounting face provided on said carriage;

wherein the first protrusion protrudes from an end of one of the lateral sides of said head arm provided with the finger, wherein the free end comprises a curved surface having a predetermined curvature, wherein the movement of the free end away from said carriage is restricted by a restricting finger;

a second protrusion having another free end, wherein the second protrusion protrudes from an end of another one of the lateral sides of said head arm opposite from one of the lateral sides of said head arm provided with the finger, wherein the another free end comprises a curved surface having a predetermined curvature, wherein the movement of the another free end toward said carriage is restricted by the mounting face; and wherein at least one of the first and second protrusions is slidably movable along the mounting face.

7. A head carriage device according to claim 6, the restricting mechanism further comprising:

said restricting finger comprising a protruding part of said fixing member, the restricting finger restricting the movement of the free end of the first protrusion; and a restricting face provided on said carriage, the restricting face restricting the movement of the free end of the second protrusion.

8. A head carriage device according to claim 7, wherein said second protrusion is longer than said first protrusion.

9. A head carriage device according to claim 7, said curved surfaces of said free ends having substantially the same curvature.

10. A head carriage device according to claim 6, wherein the first and second protrusions are slidably movable in the carriage.

* * * * *

UNITED STATES PATENT AND TRADEMARK OFFICE
CERTIFICATE OF CORRECTION

PATENT NO.    : 6,693,772 B1
DATED         : February 17, 2004
INVENTOR(S)   : Tomokuni Wauke et al.

It is certified that error appears in the above-identified patent and that said Letters Patent is hereby corrected as shown below:

<u>Column 10,</u>
Line 9, after "carriage;" insert -- a first protrusion having a free end, --.

Signed and Sealed this

Twenty-eighth Day of September, 2004

JON W. DUDAS
*Director of the United States Patent and Trademark Office*